United States Patent
Kirihara et al.

(10) Patent No.: US 7,434,238 B2
(45) Date of Patent: Oct. 7, 2008

(54) OPTICAL DISC APPARATUS

(75) Inventors: Sojiro Kirihara, Kawasaki (JP);
Yoshiyuki Tanaka, Kawasaki (JP);
Shinya Tsubota, Mito (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 388 days.

(21) Appl. No.: 11/368,682

(22) Filed: Mar. 7, 2006

(65) Prior Publication Data

US 2007/0083876 A1    Apr. 12, 2007

(30) Foreign Application Priority Data

Oct. 11, 2005   (JP)   ............... 2005-295944

(51) Int. Cl.
*G11B 33/12*   (2006.01)

(52) U.S. Cl. ............... 720/652; 720/706; 720/630

(58) Field of Classification Search ............... 720/706, 720/630, 652, 605, 604, 629, 659, 672, 675
See application file for complete search history.

(56) References Cited

U.S. PATENT DOCUMENTS

2007/0083877 A1* 4/2007 Kirihara et al. ............... 720/652

FOREIGN PATENT DOCUMENTS

| JP | 07-041783   | 2/1995  |
|----|-------------|---------|
| JP | 10-162478   | 6/1998  |
| JP | 11-345448   | 12/1999 |
| JP | 2002-352498 | 12/2002 |

* cited by examiner

*Primary Examiner*—Allen T Cao
(74) *Attorney, Agent, or Firm*—Antonelli, Terry, Stout & Kraus, LLP.

(57) ABSTRACT

An optical disc apparatus includes, as a raising/lowering mechanism for moving a second base constituting a unit mechanism portion pivotally about a fulcrum so as to raise or lower the second base with respect to a first base as a base of the optical disc apparatus, a cam mechanism which is provided pivotably on the first base side within an orthographic projection area of the optical disc that is in a chucked state and which has a cam surface formed around and in the direction of a pivot shaft. In addition, a cam pin provided on the second base side is brought into engagement with the cam surface. When the optical disc inserted into the optical disc apparatus is chucked onto a turntable so as to be rotatable, the cam mechanism is pivoted about the pivot shaft by a cam drive section.

8 Claims, 5 Drawing Sheets

OPTICAL DISC APPARATUS

CLAIM OF PRIORITY

The present application claims priority from Japanese application serial No. P2005-295944, filed on Oct. 11, 2005, the content of which is hereby incorporated by reference into this application.

BACKGROUND OF THE INVENTION

1. Technical Field of the Invention

The present invention relates to an optical disc apparatus and particularly to a drive technique for raising and lowering a turntable to chuck an optical disc.

2. Description of the Related Art

Examples of techniques related to the present invention include those disclosed in Japanese Patent Laid-open No. 2002-352498 and Japanese Utility Model Laid-open No. 7-41783. Japanese Patent Laid-open 2002-352498 discloses a disc drive wherein a traverse (unit mechanism portion) is raised and lowered by a first cam mechanism formed on a surface of a main slider and a second cam mechanism mounted on a surface of a sub-slider. Japanese Utility Model Laid-open No. 7-41783 discloses a disc drive including a cylindrical cam gear having a cylindrical cam and a lift lever member which is pivotally moved by the cylindrical cam to move the unit (unit mechanism portion) upward.

However, according to the technique described in Japanese Patent Laid-open No. 2002-352498, since the cam mechanism is formed on the slider surface, the size of the portion for raising or lowering the traverse is liable to become large. Further, it is presumed that the technique described in Japanese Utility Model Laid-open No. 7-41783 is for application to an optical disc apparatus (e.g., a half-height type) having a tray and having an allowable thickness range of, e.g., about $25 \times 10^{-3}$ mm or more. It is difficult to apply this technique to, for example, a thin slot-in type (the type in which an optical disc is pulled into the body of the optical disc apparatus directly without using a tray). Moreover, the cylindrical cam is configured to pivot in interlock with a tray pulling-in operation into the body of the optical disc apparatus during disc loading or a tray pulling-out operation to the exterior of the optical disc apparatus during disc unloading. During its pivoting motion within one full turn, it responds to the tray pulling-in or -out operation and causes the unit (unit mechanism portion) to move upward or downward. Consequently, a large cylindrical cam diameter is needed and the whole of the cylindrical cam gear becomes large-sized. Besides, the cylindrical cam gear is disposed in an area outside the outer periphery of the optical disc on a disc inlet side and thus also from this point a planar size of the optical disc apparatus is liable to increase. Further, also on the lift lever member side which engages a cam groove of the cylindrical cam, a cam follower is connected to the lift lever member and a spherical portion is formed at the tip of the cam follower and is brought into engagement with the cam groove in an extended state of the cam follower toward a side face of the cylindrical cam. Thus, the lift lever member side is also required to have a large size.

The present invention has been accomplished in view of the above-mentioned situation of the conventional techniques and the problem to be solved by-the invention is how to construct a raising/lowering mechanism for the unit mechanism portion so as to reduce the size and thickness of an optical disc apparatus.

It is an object of the present invention to solve the above-mentioned problem and provide a technique that permits a further reduction in size and thickness of an optical disc apparatus.

SUMMARY OF THE INVENTION

The present invention is a technique that has solved the above-mentioned problem.

According to the present invention, an optical disc apparatus includes, as a raising/lowering mechanism on which a disc motor and a turntable are mounted, and which move a second base constituting a unit mechanism portion pivotally about a fulcrum so as to raise or lower, or displace the second base with respect to a first base as a base of the optical disc apparatus, a cam mechanism which is provided pivotably on the first base side and which has a cam surface formed around and in the direction of a pivot shaft. In addition, a cam pin provided on the second base side is brought into engagement with the cam surface. When the optical disc inserted into the optical disc apparatus is chucked onto a turntable so as to be rotatable, the cam mechanism is pivoted about the pivot shaft by a cam drive section.

According to the present invention it is possible attain a reduction in the size of the optical disc apparatus.

DETAILED DESCRIPTION OF THE PREFERRED EMBODIMENT

An embodiment of the present invention will be described hereinunder with reference to the drawings.

Figure 1:
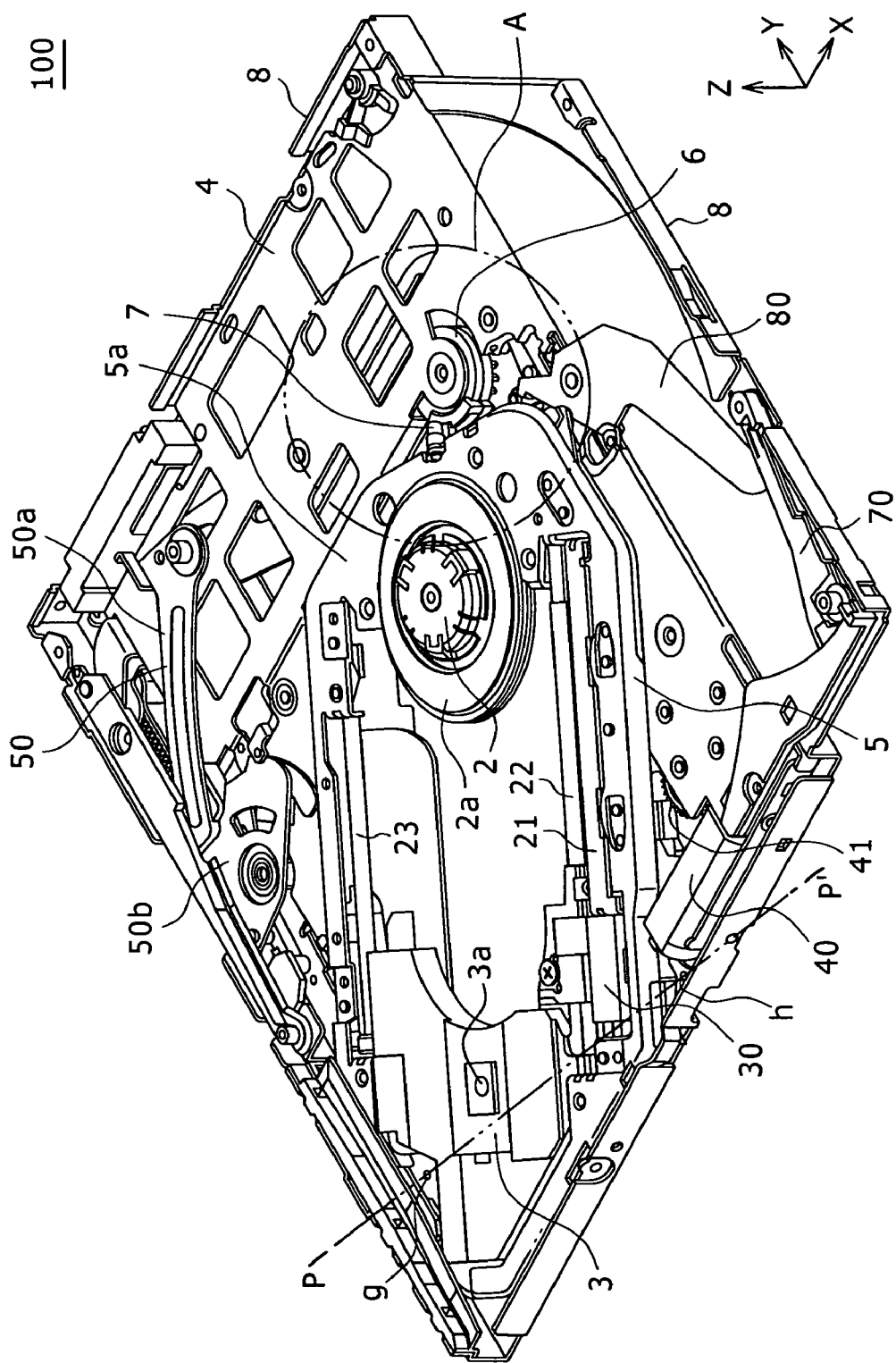
FIG. 1 illustrates an entire construction of an optical disc apparatus according to an embodiment of the present invention.
Figure 3A:
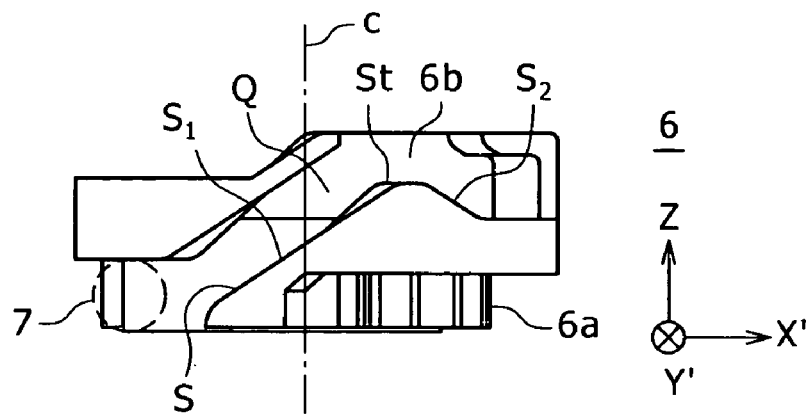
FIGS. 3A, 3B and 3C are views explanatory of operation of a cam mechanism as a raising/lowering mechanism used in the optical disc apparatus of FIG. 1.
Figure 3B:
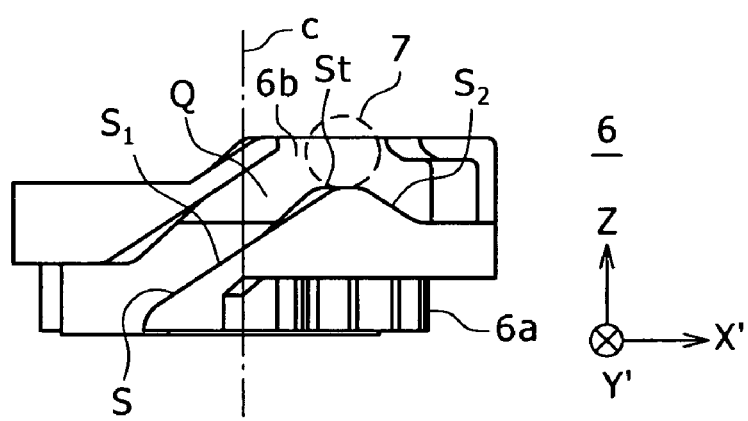
Figure 3C:
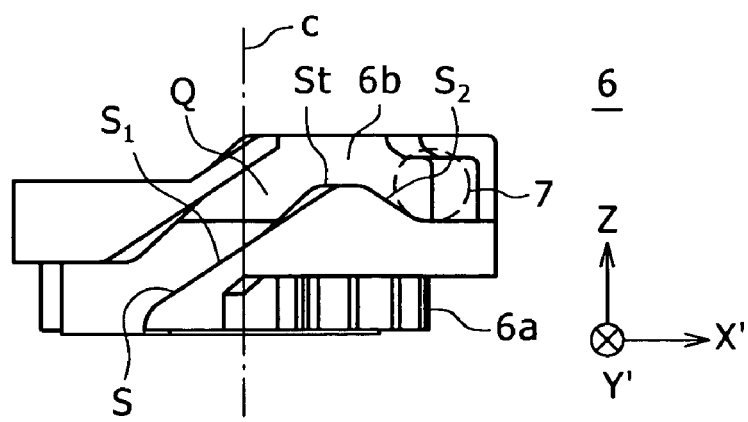
Figure 4:
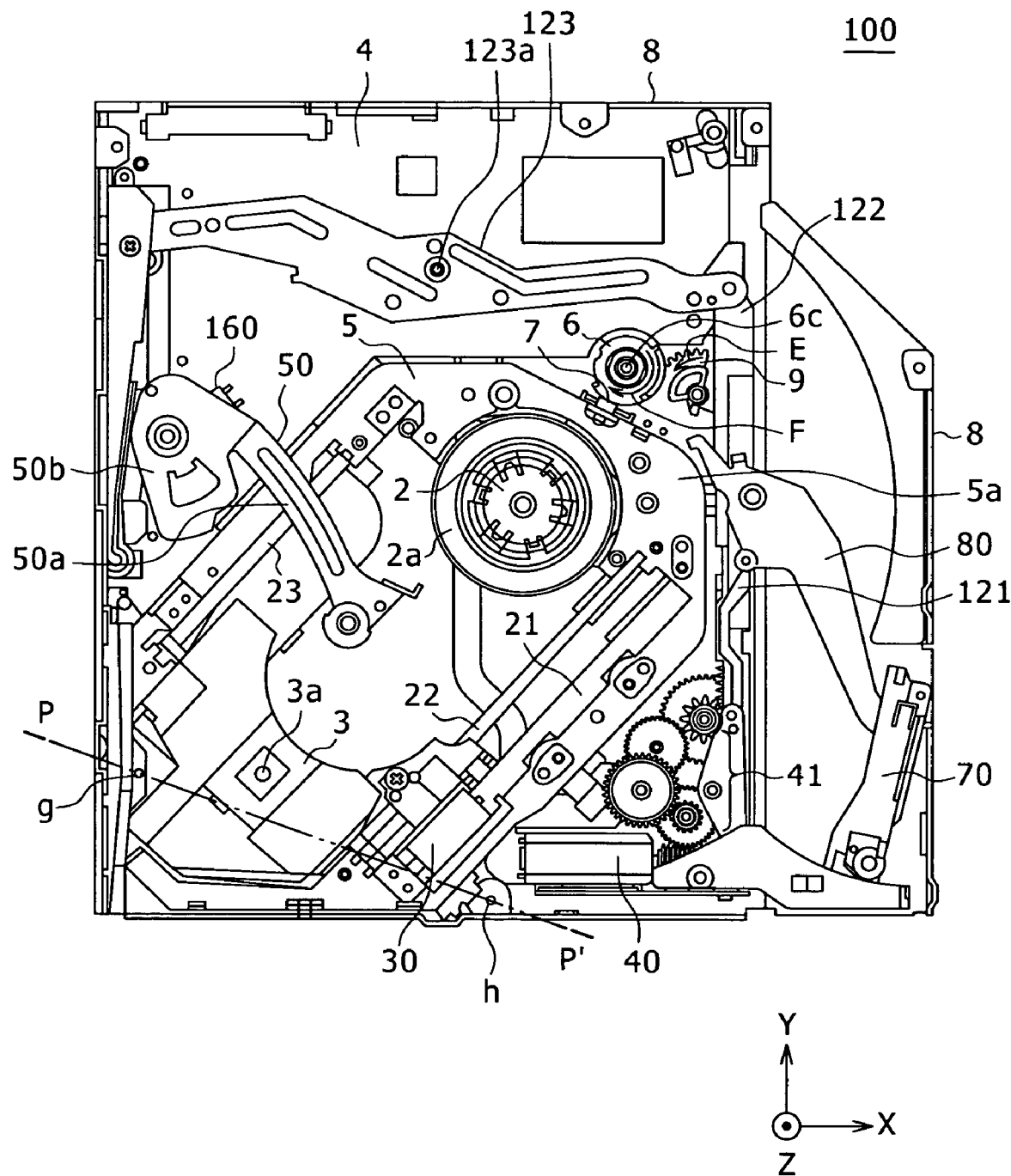
FIG. 4 illustrates the state of the optical disc apparatus of FIG. 1 before operation of the cam mechanism.
Figure 5:
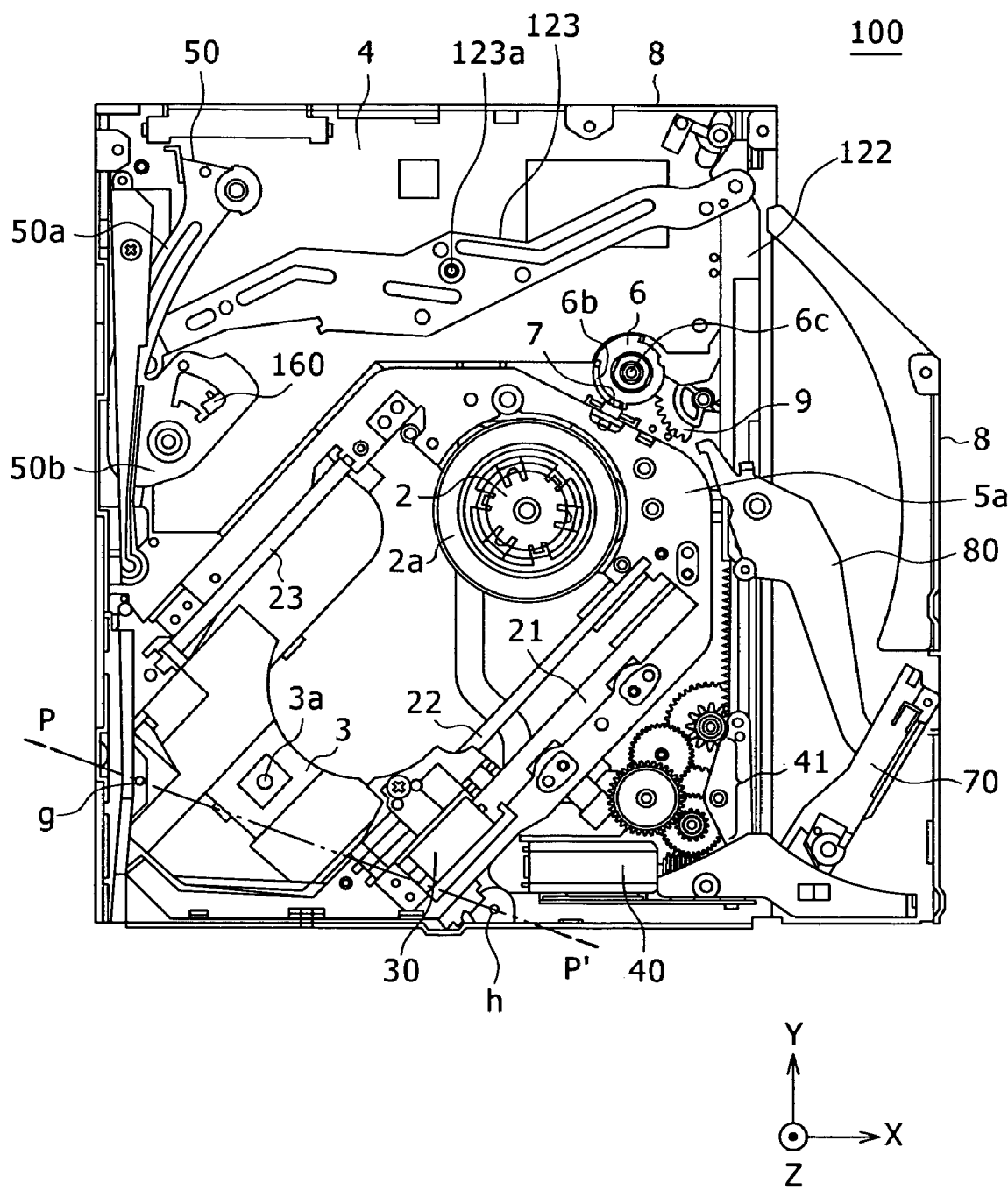
FIG. 5 illustrates the state of the optical disc apparatus of FIG. 1 after operation of the cam mechanism.

FIGS. 1 to 5 illustrate an embodiment of the present invention, of which FIG. 1 illustrates an entire construction of a slot-in type optical disc apparatus according to an embodiment of the present invention, FIG. 2 is an enlarged diagram of portion A in FIG. 1, FIG. 3 is a diagram explanatory of operation of a cam mechanism as a raising/lowering mechanism used in the optical disc apparatus of FIG. 1, FIG. 4 illustrates the state of the optical disc apparatus of FIG. 1 before operation of the cam mechanism, and FIG. 5 illustrates the state of the optical disc apparatus of FIG. 1 after operation of the cam mechanism. In FIGS. 1 to 5, the same components are identified by the same reference numerals and the same coordinate axes are used.

FIG. 1 illustrates the construction of a surface side (disc resting side) of the optical disc apparatus embodying the present invention.

In FIG. 1, reference numeral 100 denotes the optical disc apparatus. Numeral 2 denotes a disc motor for rotating an optical disc (not shown) and numeral 2a denotes a turntable for resting the optical disc thereon. Numeral 3 denotes an optical pickup and numeral 3a denotes an objective lens. Numeral 4 denotes a chassis as a first base which is a base of the optical disc apparatus. Numeral 5 denotes a unit mechanism portion in which the disc motor 2 and the optical pickup 3 are disposed. Numeral 5a denotes a unit mechanism deck member as a second base which is a support base for the unit mechanism portion 5, the unit mechanism deck member 5a being pivotable about a fulcrum with respect to the chassis 4 and with the disc motor 2 and the optical pickup 3 being mounted thereon, numeral 6 denotes a cam mechanism for moving the unit mechanism deck member 5a pivotally about a fulcrum and raising and lowering it with respect to the chassis 4. Numeral 7 denotes a cam pin provided on the side of the unit mechanism deck member 5a and engaged with a cam surface of the cam mechanism 6. Numeral 8 denotes a bottom case which covers a back side of the optical disc apparatus 100. Numeral 21 denotes a lead screw member formed with treads on the surface thereof and causing the optical pickup 3 to move in a substantially radial direction of the optical disc (not shown) by rotation of the threads. Numerals 22 and 23 denote guide members provided parallel with the lead screw member 21 to guide the movement of the optical pickup 3. Numeral 30 denotes a feed motor for drivingly rotating the lead screw member 21 and numeral 40 denotes a loading motor which generates a driving force to move the optical disc for loading or unloading. Numeral 41 denotes a gear train for transfer of the driving force from the loading motor 40 to a load side. Numeral 50 denotes an arm member which performs the transfer of the driving force for disc inserting and discharging operations when the optical disc is inserted in a Y-axis direction into the body of the optical disc apparatus from the side of a front panel (not shown) or when the optical disc is discharged from the interior of the optical disc apparatus body to the front panel side. Numeral 50a denotes an arm portion of the arm member 50 and numeral 50b denotes an arm support portion for supporting the arm portion 50a for turning. Numeral 70 denotes a disc slot arm member for pulling the optical disc into the body of the optical disc apparatus. Numeral 80 denotes a sub-lever member. Symbols g and h denote fulcrums of the unit mechanism deck member 5a and P-P' denotes a straight line ("fulcrum line" hereinafter) passing through the fulcrums g and h. On the unit mechanism deck member 5a as the second base are mounted not only the disc motor 2 and the optical pickup 3 but also the lead screw member 21, the guide members 22, 23 and the feed motor 30.

The cam mechanism 6 comprises a columnar body provided on the outer surface thereof with a cam groove formed as a cam surface. In this embodiment, the cam mechanism 6 is mounted pivotably within the range of an orthographic projection area (an orthographically projected circular area of the circular plane of the optical disc) of the optical disc chucked onto the turntable 2a. A pivot shaft of the cam mechanism 6 extends in substantially the same direction (Z-axis direction) as a rotary shaft of the disc motor 2 and the cam groove has a cam surface formed around and in the direction of the said pivot shaft (Z-axis direction). A tip of the cam pin 7 is inserted into the cam groove and comes into engagement with the cam surface The cam mechanism 6 and the cam pin 7 constitute a raising/lowering mechanism for moving the unit mechanism deck member 5a pivotally about the fulcrums g and h, that is, about the fulcrum line P-P', and raising and lowering it with respect to the chassis 4. The surface side of the optical disc apparatus 100 is covered with a top cover member (not shown). The thickness of the optical disc apparatus 100 (the distance between an outer surface of the top cover member and that of the bottom case 8) is assumed to be not larger than $9.5 \times 10^{-3}$ m.

In the following description the same components as in FIG. 1 will be identified by the same reference numerals as in FIG. 1.

Figure 2A:
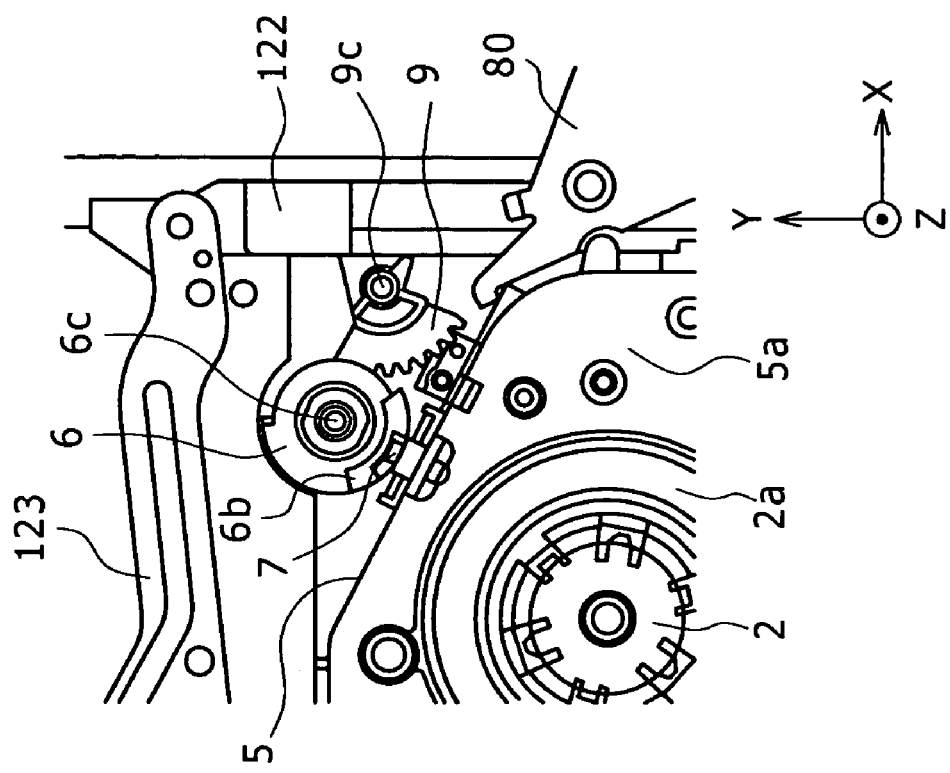
FIGS. 2A and 2B are enlarged views of portion A in FIG. 1.
Figure 2B:
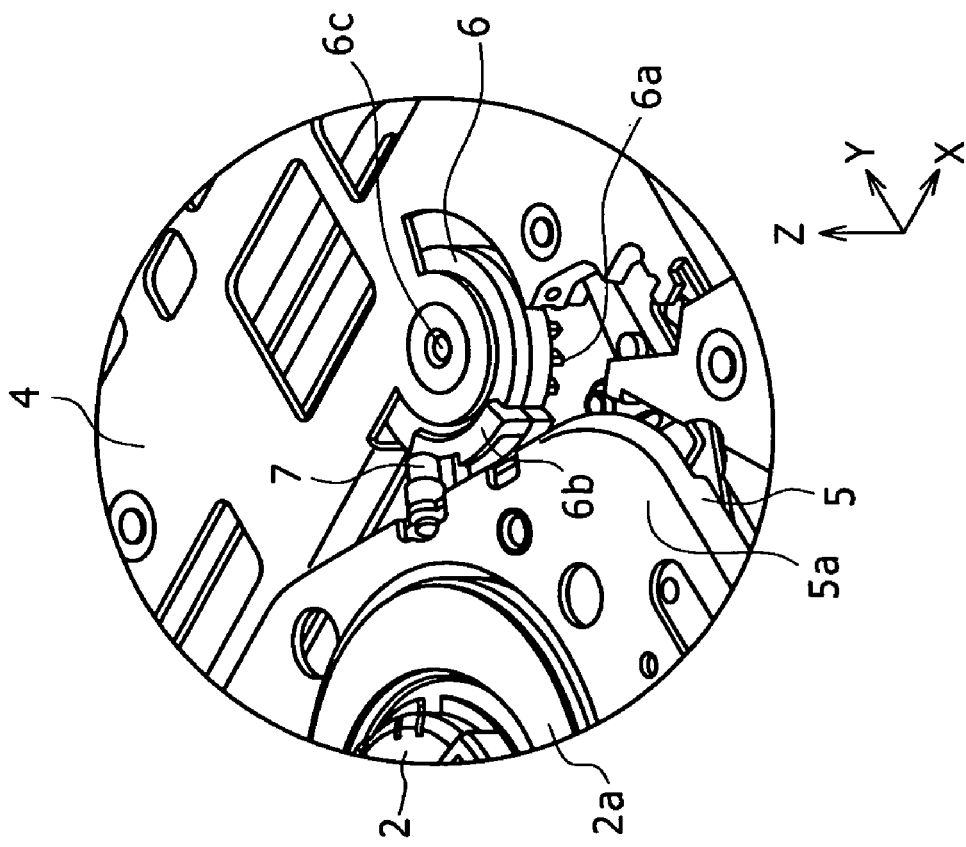

FIGS. 2A and 2B are enlarged views of portion A in FIG. 1. More particularly, FIG. 2A is a perspective view of the portion A and FIG. 2B is a plan view thereof.

In FIGS. 2A and 2B, numeral 6a denotes a driven gear as a driven portion of the cam mechanism 6, the driven gear 6a being mounted within the cam mechanism 6 and concentrically on the pivot shaft of the cam mechanism, numeral 6b denotes a cam surface-formed portion within the cam mechanism 6, and numeral 6c denotes the pivot shaft of the cam mechanism 6. Numeral 9 denotes a driving gear engaged with the driven gear 6a of the cam mechanism 6 to transmit a driving force for moving the cam mechanism 6 pivotally around the pivot shaft 6c to the driven gear 6a. Numeral 9c denotes a pivot shaft of the driving gear 9. Numerals 122 and 123 denote lever members adapted to operate at the time of loading or unloading the optical disc. During movement for loading of the optical disc or during movement for unloading of the disc, the rotational driving force of the loading motor 40 is transmitted to the lever members 122 and 123 through the transfer gear train 41. Consequently, the levers 122 and 123 displace themselves while maintaining the optical disc in a predetermined state and pull the optical disc into the body of the optical disc apparatus up to a disc chuckable position or pull out the optical disc from the chuckable position to the exterior of the body of the optical disc apparatus. Other reference numerals are the same as in FIG. 1. The cam pin 7 is disposed on a straight line joining the center (pivot center) of the pivot shaft 6c of the cam mechanism 6 and the unit mechanism deck member 5a.

For example, in loading of the optical disc, when the optical disc is inserted into the body of the optical disc apparatus up to a predetermined position, the loading motor 40 starts to rotate and its rotational driving force is transmitted through the transfer gear train 41 to the lever member 122, which in turn moves linearly and causes the driving gear 9 in a cam drive section to pivot about the pivot shaft 9c. The pivoting of the driving gear 6 causes the driven gear 6a to rotate, whereby the cam mechanism 6 is moved pivotally about the pivot shaft 6c. With this pivotal movement of the cam mechanism 6, the cam surface moves and the cam pin 7 thereby moves in the pivot shaft direction of the cam mechanism 6, i.e., in the Z-axis direction, along the curved line of the cam surface. With this movement in the Z-axis direction of the cam pin 7, the unit mechanism deck member 5a moves pivotally about the fulcrums g and h, i.e., about the fulcrum line P-P', and causes the disc motor 2 and the turntable 2a on the unit mechanism deck member 5a to rise relative to the chassis 4. With the rising motion of the turntable 2a, the optical disc is raised into abutment against the inner surface of the top cover and is chucked in this state.

FIG. 3 is a diagram explanatory of operation of the cam mechanism 6 as the raising/lowering mechanism in the optical disc apparatus of FIG. 1.

More specifically, FIG. 3A illustrates a state in which the cam pin 7 has not started yet its rising motion in the Z-axis direction caused by pivoting of the cam mechanism 6. FIG. 3B illustrates the position of the cam pin 7 on the cam surface in a chucked state of the optical disc after start of the rising motion of the cam pin in the pivot shaft direction of the cam mechanism 6 (Z-axis direction) along the cam surface. FIG. 3C illustrates the position of the cam pin 7 on the cam surface at the beginning of write or read operation after chucking of the optical disc.

In FIGS. 3A to 3C, symbol c denotes a pivotal center of the cam mechanism 6, Q denotes a cam groove formed in the cam mechanism 6, $S_1$ denotes a first cam surface of the cam mechanism 6, $S_2$ denotes a second cam surface of the cam mechanism 6, and $S_t$ denotes a maximum cam surface having a maximum curved line between the first and second cam surfaces $S_1$, $S_2$. Other reference numerals and symbols are the same as in FIGS. 1 and 2. When the optical disc is chucked, the driving gear 9 rotates in the counterclockwise direction to rotate the driven gear 6a, whereby the cam mechanism 6 is pivotally moved clockwise around the pivotal center c, i.e., around the pivot shaft 6c. With the clockwise pivoting of the cam mechanism 6, the cam surfaces $S_1$, $S_t$ and $S_2$ move in this order relative to the cam pin 7, whereby the cam pin 6 moves in both Z-axis and −Z-axis directions along the curved lines of the cam surfaces $S_1$, $S_t$ and $S_2$. When the cam mechanism 6 pivots and the cam pin 7 moves from its position shown in FIG. 3A into abutment against the cam surface $S_1$, the cam surface $S_1$ causes the cam pin 7 to move upward in the Z-axis direction along the curved line thereof. With this upward movement of the cam pin 7, the unit mechanism deck member 5a also pivots counterclockwise about the fulcrums g and h, i.e., about the fulcrum line P-P', causing the disc motor 2, the turntable 2a and the optical disc (not shown) to move upward with respect to the chassis 4. As a result, the optical disc on the turntable 2a approaches the overlying top cover (not shown). When the cam pin 7 arrives at the position of the cam surface $S_t$, it occupies the height position in the Z-axis direction (FIG. 3B). At this position the optical disc on the turntable 2a is pushed against the inner surface of the top cover so as to be brought into a chucked state on the turntable. As the cam mechanism 6 further moves pivotally in the clockwise direction, the cam pin 7 comes into abutment against the cam surface $S_2$. On the cam surface $S_2$ the cam pin 7 is moved gradually downward in the −Z-axis direction. With this downward movement of the cam pin 7, the unit mechanism deck member 5a also pivots clockwise about the fulcrums g and h, i.e., about the fulcrum line P-P', causing the disc motor 2, the turntable 2a and the optical disc to move downward relative to the chassis 4. With this downward movement, the optical disc on the turntable 2a moves away from the inner surface of the top cover and becomes rotatable, permitting write or read operation.

For unloading of the optical disc, the driving gear 9 rotates in the clockwise direction to drive the driven gear 6a, thereby causing the cam mechanism 6 to pivot counterclockwise about the pivotal center c and allowing the cam surface to abut the cam surfaces $S_2$, $S_t$ and $S_1$ in this order. Thus, the cam pin 7 is moves in the Z-axis and −Z-axis directions along the curved lines of the cam surfaces $S_2$, $S_t$ and $S_1$, causing the unit mechanism deck member 5a to pivot about the fulcrum line P-P' to raise the turntable 2a and allowing the optical disc to move away from the upper surface of the turntable 2a to cancel its chucked state.

FIG. 4 illustrates the state of the optical disc apparatus of FIG. 1 before operation of the cam mechanism as the raising/lowering mechanism in the optical disc apparatus and FIG. 5 illustrates the state of the same optical disc apparatus after operation of the cam mechanism.

In FIGS. 4 and 5, numeral 160 denotes a switch for turning ON and OFF the loading motor 40. Other reference numerals and symbols are the same as in FIGS. 1 and 2. In loading of the optical disc, when the optical disc is loaded into the body of the optical disc apparatus 100 that is in the state of FIG. 4, the optical disc is further pulled inwards of the body of the optical disc apparatus by the disc slot arm member 70 and the sub-lever member 80. At the same time, the lever members 122 and 123 operate to move the arm portion 50a and arm support portion 50b of the arm member 50 pivotally about the fulcrum. With this pivotal motion of the arm support portion 50b, the switch 160 is pushed to turn ON and rotate the loading motor 40. As a result, the rotational driving force of the loading motor 40 is transmitted to the lever member 122 through the transfer gear train 41 and further transmitted to the driving gear 9 in the cam drive section to move the driving gear 9 pivotally about the pivot shaft 9c. The driving gear 9 is rotated to drive the driven gear 6a, thereby moving the cam mechanism 6 pivotally about the pivot shaft 6c. By movement of the cam surface resulting from the pivotal motion of the cam mechanism 6 the cam pin 7 engaged in the cam groove is moved in the Z-axis or −Z-axis direction along the curved line of the cam surface. With this movement in Z-axis or −Z-axis direction of the cam pin 7, the unit mechanism deck member 5a pivots about the fulcrums g and h, i.e., the fulcrum line P-P', causing the disc motor 2 and the turntable 2a on the unit mechanism deck member 5a to move relative to the chassis 4 to chuck the optical disc onto the turntable 2a. At this time, the optical disc apparatus 100 assumes the state of FIG. 5. When the switch 160 is pushed, an output signal from the switch 160 is inputted to, for example, a microcomputer serving as control means for the optical disc apparatus 100 and the operation of the loading motor 40 is controlled in accordance with a control signal provided from the microcomputer.

According to the above construction of this embodiment, the cam mechanism 6 causes the cam pin 7 to move upward or downward only when the optical disc inserted into the optical disc apparatus is chucked onto the turntable and brought into a rotatable state and when the said state is cancelled and the optical disc is brought into a removable state to the exterior of the optical disc apparatus. Therefore, the cam mechanism 6 can be configured to be small in size and thin in thickness by shortening the cam stroke and making the cam surface simple in structure, relatively small in amplitude in the pivot shaft direction. Consequently, it is possible to attain a reduction in the planar size and thickness of the entire optical disc apparatus. Besides, since the cam mechanism 6 is disposed on the chassis 4 and within an orthographic projection area of the optical disc chucked onto the turntable 2a, it is possible also in this point to attain a further reduction particularly in planar size of the optical disc apparatus.

The present invention can be carried out also in other modes than the above embodiment without departing from the spirit or principal features of the invention. Therefore, the above embodiment, in all of the points described above, is a mere illustration of the present invention and should not be understood limitatively. The scope of the present invention is shown by the following claims. Further, modifications and changes falling under an equivalent scope of the following claims are all included within the scope of the present invention.

What is claimed is:

1. An optical disc apparatus for performing write or read of information in a state of changing a height position of a disc plane after chucking of an optical disc onto a turntable, comprising:
   a first base serving as a base of the optical disc apparatus;
   a second base on which a disc motor for rotationally driving said turntable is mounted and which is pivotable about a fulcrum with respect to said first base;
   a cam mechanism provided pivotably on the side of said first base and having a cam surface formed around and in the direction of a pivot shaft extending in substantially the same direction as a rotary shaft of said disc motor;

a cam pin provided on the side of said second base and engaging the cam surface of said cam mechanism; and a cam drive section for rotationally driving said cam mechanism;

wherein when the optical disc inserted into the optical disc apparatus is chucked and brought into a rotatable state, said cam drive section rotationally drives said cam mechanism, which causes an abutted portion of said cam pin against said cam surface to be displaced in a pivot shaft direction of said cam mechanism to pivotally displace said second base, thereby raising or lowering a height position of said turntable.

2. An optical disc apparatus according to claim 1, wherein said cam mechanism is disposed within an orthographic projection area of the chucked optical disc.

3. An optical disc apparatus according to claim 1, wherein said cam mechanism comprises a columnar body provided with a groove forming a cam surface on the outer circumference thereof.

4. An optical disc apparatus according to claim 1, wherein said cam mechanism has a maximum cam surface height in the pivot shaft direction and the chucking of said optical disc is completed at the position corresponding to said maximum cam surface height.

5. An optical disc apparatus according to claim 1, wherein said cam drive section comprises a driven gear mounted concentrically on the pivot shaft of said cam mechanism and a driving gear which causes said driven gear to rotate.

6. An optical disc apparatus according to claim 1, wherein said cam drive section is given a driving force from a mechanism which comes into abutment against the outer periphery of said optical disc and pulls the optical disc directly into a body of the optical disc apparatus, and causes a driven gear mounted concentrically on the pivot shaft of said cam mechanism to rotate.

7. An optical disc apparatus according to claim 1, wherein said cam pin is disposed on a straight line joining a pivotal axis of said cam mechanism and said second base.

8. An optical disc apparatus according to claim 1, wherein said optical disc apparatus has a thickness of not larger than $9.5 \times 10^{-3}$ m.

* * * * *